US008831535B2

(12) United States Patent
Uejima (10) Patent No.: US 8,831,535 B2
(45) Date of Patent: Sep. 9, 2014

(54) HIGH-FREQUENCY MODULE (75) Inventor: Takanori Uejima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 197 days.

(21) Appl. No.: 13/371,647

(22) Filed: Feb. 13, 2012

(65) Prior Publication Data

US 2012/0208475 A1 Aug. 16, 2012

(30) Foreign Application Priority Data

Feb. 14, 2011 (JP) ................................. 2011-028060

(51) Int. Cl.
H04B 1/44 (2006.01)
H04B 1/00 (2006.01)

(52) U.S. Cl.
CPC . *H04B 1/44* (2013.01); *H04B 1/006* (2013.01)
USPC ...... 455/78; 455/41.1; 455/414.2; 340/539.1; 340/572.1

(58) Field of Classification Search
USPC .......................... 455/78, 83, 90.3, 403, 550.1
See application file for complete search history.

(56) References Cited

U.S. PATENT DOCUMENTS

| 8,036,148 B2 * | 10/2011 | Fukamachi et al. .......... 370/282 |
| 2005/0197095 A1 | 9/2005 | Nakamata et al. |
| 2006/0145804 A1 | 7/2006 | Matsutani et al. |
| 2009/0207764 A1 | 8/2009 | Fukamachi et al. |

FOREIGN PATENT DOCUMENTS

| CN | 101438505 A | 5/2009 |
| CN | 100555861 C | 10/2009 |
| EP | 2 017 966 A1 | 1/2009 |
| EP | 2 302 814 A2 | 3/2011 |
| JP | 2001-267128 A | 9/2001 |
| JP | 2004-007408 A | 1/2004 |
| JP | 2004-281847 * | 10/2004 | ............ H01F 17/00 |
| JP | 2004-281847 A | 10/2004 |
| JP | 2005-020140 A | 1/2005 |
| JP | 2008-010995 A | 1/2008 |
| JP | 2011-077723 A | 4/2011 |
| WO | 2004/055841 A1 | 7/2004 |
| WO | 2009/157283 A1 | 12/2009 |

OTHER PUBLICATIONS

Official Communication issued in corresponding Japanese Patent Application No. 2011-028060, mailed on Mar. 12, 2013.
Official Communication issued in corresponding European Patent Application No. 12155137.8, mailed on Jun. 6, 2012.
Official Communication issued in corresponding Chinese Patent Application No. 201210052498.7, mailed on Jun. 16, 2014.

* cited by examiner

*Primary Examiner* — Tuan H Nguyen
(74) *Attorney, Agent, or Firm* — Keating & Bennett, LLP (57) ABSTRACT In a high frequency module, an inductor is formed with a common terminal of a switch element as a starting point so as to wind in a substantially spiral shape clockwise when viewed from an upper surface side of a laminated body, and inductors are formed with a first individual external terminal and a second individual external terminal as starting points so as to wind in a substantially spiral shape clockwise when viewed from the upper surface side of the laminated body, the first individual external terminal and the second individual external terminal defining input ends of transmission signals. Other inductors are also formed so as to wind in a substantially spiral shape clockwise when viewed from the upper surface side of the laminated body such that all the directions of magnetic fields generated by the inductors coincide with one another.

6 Claims, 4 Drawing Sheets

HIGH-FREQUENCY MODULE

BACKGROUND OF THE INVENTION

1. Field of the Invention

The present invention relates to a high-frequency module that transmits and receives a plurality of communication signals using a common antenna.

2. Description of the Related Art

In the past, various kinds of high-frequency modules have been designed to transmit and receive a plurality of communication signals using a common antenna, each of the plural communication signals utilizing a different frequency band. For example, such a high-frequency module is described in Japanese Unexamined Patent Application Publication No. 2008-10995.

The high-frequency module described in Japanese Unexamined Patent Application Publication No. 2008-10995 includes a laminated body including a predetermined inner layer electrode pattern, and a switch element and an SAW filter that are mounted in the upper surface of the laminated body. The switch element includes a common terminal to be connected to an antenna and individual terminals each of which is to be connected to a transmission circuit or a reception circuit, used for a plurality of communication signals. On the basis of a control signal, the switch element connects one of the individual terminals to the common terminal, and hence switches to and connects one of the transmission circuit and the reception circuit to the antenna.

In the case of such a high-frequency module utilizing the laminated body, a circuit configuration other than mounted components such as the switch element and the SAW filter is realized using inner layer electrode patterns formed within the laminated body.

However, when the high-frequency module is downsized, electromagnetic field coupling occurs between circuit elements realized by these inner layer electrode patterns. For example, a plurality of inductors on a transmission path transmitting one communication signal are electromagnetic-field-coupled to one another, an inductor of a circuit on the common terminal side of the switch element is electromagnetic-field-coupled to an inductor of a circuit on the individual terminal side of the switch element, or inductors individually connected onto a plurality of different transmission paths are electromagnetic-field-coupled to one another. In such a case, it may be hard to obtain a desired transmission characteristic. For example, an inductor of a low pass filter used for a second harmonic wave and an inductor of a low pass filter used for a third harmonic wave, connected in series onto one transmission circuit, are electromagnetic-field-coupled to each other, and hence it may be hard to fully attenuate the second harmonic wave and the third harmonic wave of a communication signal transmitted through the corresponding transmission circuit. In addition, an inductor used for an antenna side matching circuit is electromagnetic-field-coupled to an inductor of a low pass filter used for a second harmonic wave or an inductor of a low pass filter used for a third harmonic wave, connected in series to a transmission circuit, and hence it may be hard to fully attenuate the harmonic wave of a communication signal transmitted through the corresponding transmission circuit.

SUMMARY OF THE INVENTION

Accordingly, preferred embodiments of the present invention provide a high-frequency module that prevents and suppresses electromagnetic field coupling between inductors included in a laminated body and obtain a desired characteristic while being downsized.

According to a preferred embodiment of the present invention, a high-frequency module includes a laminated body including an antenna connection external terminal arranged to be connected to an antenna and a plurality of individual external terminals to each of which a transmission circuit used to transmit a plurality of communication signals and a reception circuit used to receive the plural communication signals are connected; and a switch element arranged in the laminated body and including a common terminal to be connected to the antenna connection external terminal and a plurality of individual terminals to be connected to the plural individual external terminals. The high-frequency module includes a plurality of inductors on an individual terminal side, which are provided within the laminated body and individually connected in series between the plural individual terminals and the plural individual external terminals. The plural inductors on the individual terminal side do not overlap with one another in a state in which the laminated body is viewed along a lamination direction, and are arranged within the laminated body so that directions of generated magnetic fields coincide with one another.

According to this configuration, it is possible to sufficiently prevent and suppress magnetic field coupling between the inductors on the individual terminal side. Accordingly, each inductor functions so as to comply with circuit design, and a desired transmission characteristic is realized.

In addition, it is preferable that a high-frequency module according to a preferred embodiment of the present invention includes the following configuration. The high-frequency module preferably includes an inductor on an antenna side, arranged to be connected in series between the antenna connection external terminal and the common terminal. The inductor on the antenna side and the plural inductors on the individual terminal side do not overlap with one another in a state in which the laminated body is viewed along the lamination direction, and are arranged within the laminated body so that directions of generated magnetic fields coincide with one another.

According to this configuration, it is possible to sufficiently prevent and suppress magnetic field coupling between the inductor on the antenna side and the inductor on the individual terminal side. Accordingly, each of the inductors on both the antenna side and the individual terminal side of the switch element functions so as to comply with circuit design, and a desired transmission characteristic is realized.

In addition, it is preferable that a high-frequency module according to a preferred embodiment of the present invention includes the following configuration. In the high-frequency module, inner layer electrode patterns of the plural inductors on the individual terminal side preferably are located on a plurality of same layers of the laminated body.

According to this configuration, each inductor is located on the same layer in the laminated body, and hence it is possible to prevent and suppress magnetic field coupling along the lamination direction. Accordingly, it is possible to more effectively prevent and suppress coupling between inductors.

In addition, it is preferable that a high-frequency module according to a preferred embodiment of the present invention includes the following configuration. In the high-frequency module, an inner layer electrode pattern of the inductor on the antenna side and the inner layer electrode patterns of the plural inductors on the individual terminal side are preferably located on the plural same layers of the laminated body. Distances between the inner layer electrode pattern of the inductor on the antenna side and the inner layer electrode patterns of the plural inductors on the individual terminal side when viewed in the lamination direction are longer than distances between the inner layer electrode patterns of the plural inductors on the individual terminal side.

According to this configuration, it is possible to more effectively prevent and suppress magnetic field coupling between the inductor on the antenna side and the inductors on the individual terminal side. Accordingly, it is possible to prevent an undesirable signal from leaking from a predetermined circuit on the individual terminal side to the antenna. Accordingly, it is possible to prevent the second harmonic wave or the third harmonic wave of a transmission signal from leaking from the transmission circuit to the antenna side. In addition, it is possible to prevent a communication signal from the antenna from going around to an unintended circuit on the individual terminal side without passing through the switch element. Accordingly, it is possible to transmit a reception signal from the antenna to a desired reception circuit with low loss.

In addition, it is preferable that a high-frequency module according to a preferred embodiment of the present invention includes the following configuration. In the high-frequency module, an inner layer ground electrode arranged in an upper layer and a lower layer of a layer in which the inner layer electrode pattern of the inductor in the laminated body is provided, so as to include a forming region of the inner layer electrode pattern of the inductor when viewed from the lamination direction. A distance between the inner layer electrode pattern of the inductor closest to the inner layer ground electrode and the inner layer ground electrode is shorter than distances between the inner layer electrode patterns individually defining the plural inductors.

According to this configuration, each inductor is sandwiched in the lamination direction by the inner layer ground electrode, and each inductor and the inner layer ground electrode are adjacent to each other. Therefore, it is possible to more effectively achieve independence of a magnetic field generated in each inductor, namely, the suppression of coupling between magnetic fields generated in the individual inductors.

In addition, it is preferable that a high-frequency module according to a preferred embodiment of the present invention includes the following configuration. In the high-frequency module, the plural inductors on the individual terminal side are inductors of a filter circuit connected to the transmission circuit.

According to this configuration, an example is illustrated in which, as the above-mentioned inductors on the individual terminal side, the inductors of the filter circuit connecting to the transmission circuit are preferably used. Since the transmission circuit transmits a high-power transmission signal, while it may be easy for inductors to be magnetic-field-coupled to one another, magnetic field coupling between the inductors is prevented and suppressed by utilizing the above-mentioned configuration. Accordingly, it is possible to cause the transmission circuit to have desired filter characteristics (a transmission characteristic and an attenuation characteristic).

In addition, it is preferable that a high-frequency module according to a preferred embodiment of the present invention includes the following configuration. In the high-frequency module, the filter circuit is a low pass filter attenuating a second harmonic wave and a third harmonic wave of a transmitted communication signal. The plural inductors on the individual terminal side include a series inductor used to attenuate the second harmonic wave and a series inductor used to attenuate the third harmonic wave.

In this configuration, a more specific example of a circuit configuration is illustrated when being applied to the above-mentioned transmission circuit. By adopting such a configuration, it is possible to obtain the attenuations of the second harmonic wave and the third harmonic wave of the transmission signal, which are sufficient attenuations complying with circuit design.

According to various preferred embodiments of the present invention, a high-frequency module that obtains a desired characteristic while being downsized is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A high-frequency module according to a first preferred embodiment of the present invention will be described with reference to drawings. In the present preferred embodiment, a high-frequency module will be described that transmits and receives a communication signal of a global system for mobile communications (GSM) 850, a communication signal of a GSM900, a communication signal of a GSM1800, and a communication signal of a GSM1900 and transmits and receives a universal mobile telecommunications system (UMTS) communication signal such as a wideband code division multiple access (W-CDMA) communication system or other communication system, for example. In addition, while, in the present preferred embodiment, a case is illustrated in which a transmission and reception circuit for three types of UMTS communication signals is provided, the transmission and reception circuit for these UMTS communication signals may also be omitted.

Figure 1:
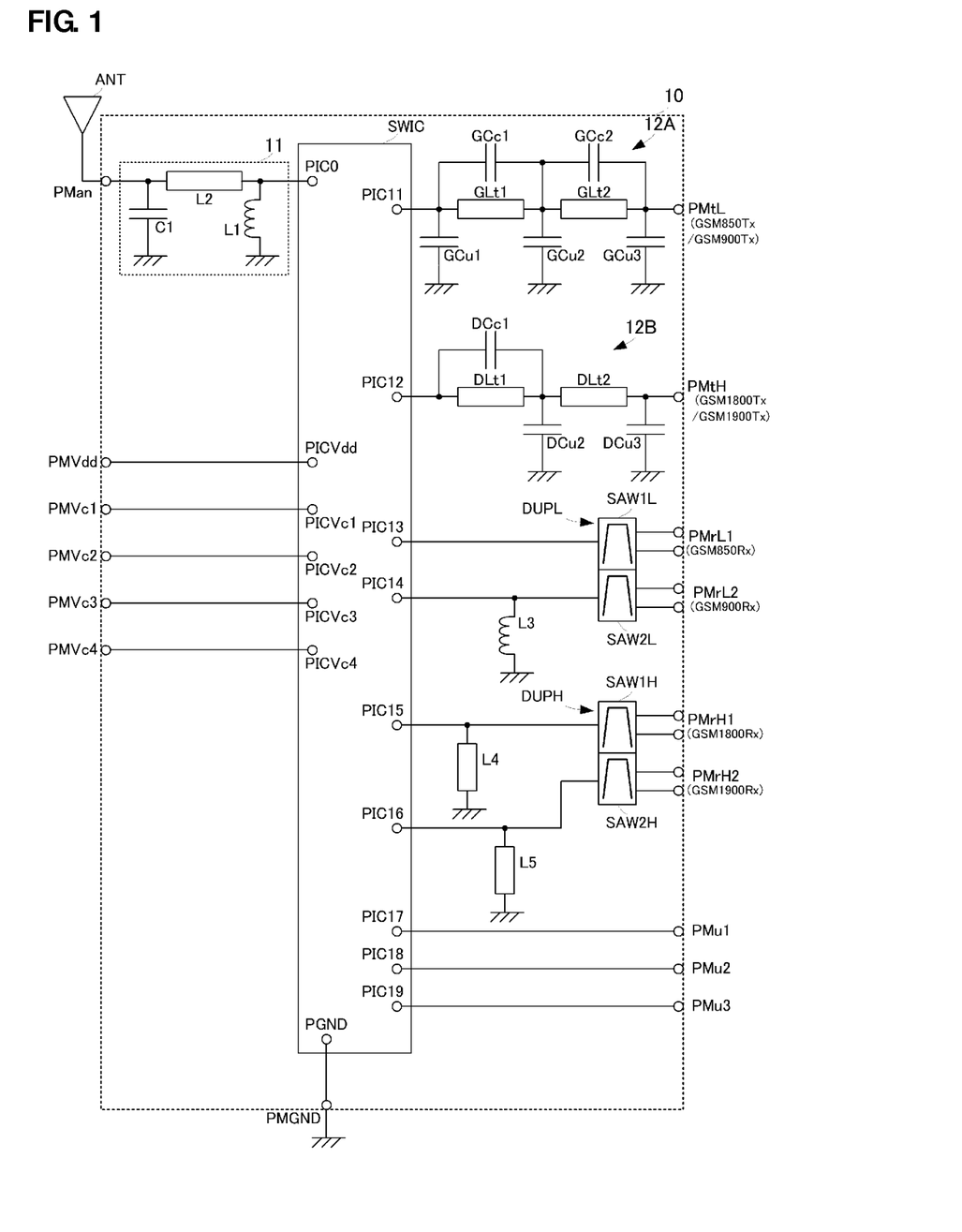
FIG. 1 is a block diagram illustrating a circuit configuration of a high-frequency module according to a preferred embodiment of the present invention.

First, the circuit configuration of a high-frequency module 10 of the present preferred embodiment will be described. FIG. 1 is a block diagram illustrating the circuit configuration of the high-frequency module 10 according to the present preferred embodiment.

A switch element SWIC includes a single common terminal PIC0 and nine individual terminals PIC11 to PIC19. The switch element SWIC includes a ground terminal PGND used to connect to a ground GND. The ground terminal PGND connects to a ground port electrode PMGND in the high-frequency module 10, used for an external connection.

The switch element SWIC includes a driving voltage application terminal PICVdd and a plurality of control voltage application terminals PICVc1, PICVc2, PICVc3, and PICVc4. The driving voltage application terminal PMVdd connects to a power supply system port electrode PMVdd in the high-frequency module 10, used for an external connection. The control voltage application terminals PICVc1, PICVc2, PICVc3, and PICVc4 connect to power supply system port electrodes PMVc1, PMVc2, PMVc3, and PMVc4 in the high-frequency module 10, respectively, used for external connections.

The switch element SWIC is driven using a driving voltage Vdd applied from the driving voltage application terminal PICVdd. On the basis of the combination of control voltages Vc1, Vc2, Vc3, and VC4 applied to the plural control voltage application terminals PICVc1, PICVc2, PICVc3, and PICVc4, respectively, the switch IC element SWIC connects the single common terminal PIC0 to one of the nine individual terminals PIC11 to PIC19.

The common terminal PIC0 connects to an antenna connection external terminal PMan in the high-frequency module 10 through an antenna side matching circuit 11 doubling as an ESD circuit. The antenna connection external terminal PMan connects to an external antenna ANT.

The antenna side matching circuit 11 includes an inductor L2 connected in series between the antenna connection external terminal PMan and the common terminal PIC0. An end portion on the antenna connection external terminal PMan side of the inductor L2 is connected to the ground GND through a capacitor C1. An end portion on the common terminal PIC0 side of the inductor L2 is connected to the ground GND through an inductor L1 mainly functioning as an ESD element.

The first individual terminal PIC11 connects to a first individual external terminal PMtL in the high-frequency module 10 through a transmission side filter 12A. The first individual external terminal PMtL is a terminal into which the transmission signal of the GSM850 or the transmission signal of the GSM900 is input from the outside.

The transmission side filter 12A includes inductors GLt1 and GLt2 connected in series between the first individual terminal PIC11 and the first individual external terminal PMtL. At this time, the inductor GLt1 and the inductor GLt2 are connected in this order from a first individual terminal PIC11 side. An end portion on the first individual terminal PIC11 side of the inductor GLt1 is connected to the ground GND through a capacitor GCu1. A connection point between the inductors GLt1 and GLt2 is connected to the ground GND through a capacitor GCu2. An end portion on the first individual external terminal PMtL side of the inductor GLt2 is connected to the ground GND through a capacitor GCu3.

A capacitor GCc1 is connected in parallel to the inductor GLt1. By setting the element value of this parallel resonance circuit to a predetermined value, a characteristic is realized that effectively attenuates the frequencies of the second harmonic waves of transmission signals input from the first individual external terminal PMtL, namely, the GSM850 transmission signal and the GSM900 transmission signal.

A capacitor GCc2 is connected in parallel to the inductor GLt2. By setting the element value of this parallel resonance circuit to a predetermined value, a characteristic is realized that effectively attenuates the frequencies of the third harmonic waves of the transmission signals input from the first individual external terminal PMtL, namely, the GSM850 transmission signal and the GSM900 transmission signal.

Furthermore, by setting the element value of each of the inductors and the capacitors defining the transmission side filter 12A, a filter is realized whose pass band corresponds to the operation frequencies of the transmission signal of the GSM850 and the transmission signal of the GSM900 and whose stop band corresponds to a high frequency band including the second harmonic waves and the third harmonic waves of the transmission signal of the GSM850 and the transmission signal of the GSM900.

The second individual terminal PIC12 connects to a second individual external terminal PMtH in the high-frequency module 10 through a transmission side filter 12B. The second individual external terminal PMtH is a terminal into which the transmission signal of the GSM1800 or the transmission signal of the GSM1900 is input from the outside.

The transmission side filter 12B includes inductors DLt1 and DLt2 connected in series between the second individual terminal PIC12 and the second individual external terminal PMtH. At this time, the inductor DLt1 and the inductor DLt2 are connected in this order from a second individual terminal PIC12 side. A connection point between the inductors DLt1 and DLt2 is connected to the ground GND through a capacitor DCu2. An end portion on the second individual external terminal PMtH side of the inductor DLt2 is connected to the ground GND through a capacitor DCu3.

A capacitor DCc1 is connected in parallel to the inductor DLt1. By setting the element value of this parallel resonance circuit to a predetermined value, a characteristic is realized that desirably attenuates the frequencies of the second harmonic waves of transmission signals input from the second individual external terminal PMtH, namely, the GSM1800 transmission signal and the GSM1900 transmission signal.

Furthermore, by setting the element value of each of the inductors and the capacitors defining the transmission side filter 12B, a filter is realized whose pass band corresponds to the operation frequencies of the transmission signal of the GSM1800 and the transmission signal of the GSM1900 and whose stop band corresponds to a high frequency band including the second harmonic waves and the third harmonic waves of the transmission signal of the GSM1800 and the transmission signal of the GSM1900.

The third individual terminal PIC13 connects to the unbalanced terminal of a SAW filter SAW1L in a SAW duplexer DUPL. The SAW filter SAW1L is a filter whose pass band corresponds to the frequency band of the reception signal of the GSM850, and includes a balanced-to-unbalanced conversion function. The balanced terminal of the SAW filter SAW1L connects to a third individual external terminal PMrL1 in the high-frequency module 10. The third individual external terminal PMrL1 is a terminal from which the reception signal of the GSM850 is output.

The fourth individual terminal PIC14 connects to the unbalanced terminal of a SAW filter SAW2L in the SAW duplexer DUPL. A matching inductor L3 is connected between a transmission line connecting the fourth individual terminal PIC14 and the SAW filter SAW2L to each other and a ground potential. The SAW filter SAW2L is a filter whose pass band corresponds to the frequency band of the reception signal of the GSM900, and includes a balanced-to-unbalanced conversion function. The balanced terminal of the SAW filter SAW2L connects to a fourth individual external terminal PMrL2 in the high-frequency module 10. The fourth individual external terminal PMrL2 is a terminal from which the reception signal of the GSM900 is output.

The fifth individual terminal PIC15 connects to the unbalanced terminal of a SAW filter SAW1H in a SAW duplexer DUPH. A matching inductor L4 is connected between a transmission line connecting the fifth individual terminal PIC15 and the SAW filter SAW1H to each other and the ground potential. The SAW filter SAW1H is a filter whose pass band corresponds to the frequency band of the reception signal of the GSM1800, and includes a balanced-to-unbalanced conversion function. The balanced terminal of the SAW filter SAW1H connects to a fifth individual external terminal PMrH1 in the high-frequency module 10. The fifth individual external terminal PMrH1 is a terminal from which the reception signal of the GSM1800 is output.

The sixth individual terminal PIC16 connects to the unbalanced terminal of a SAW filter SAW2H in the SAW duplexer DUPH. A matching inductor L5 is connected between a transmission line connecting the sixth individual terminal PIC16 and the SAW filter SAW2H to each other and the ground potential. The SAW filter SAW2H is a filter whose pass band corresponds to the frequency band of the reception signal of the GSM1900, and includes a balanced-to-unbalanced conversion function. The balanced terminal of the SAW filter SAW2H connects to a sixth individual external terminal PMrH2 in the high-frequency module 10. The sixth individual external terminal PMrH2 is a terminal from which the reception signal of the GSM1900 is output.

The seventh individual terminal PIC17 connects to a seventh individual external terminal PMu1 in the high-frequency module 10. The seventh individual external terminal PMu1 is a terminal used to input and output a first UMTS communication signal. The eighth individual terminal PIC18 connects to an eighth individual external terminal PMu2 in the high-frequency module 10. The eighth individual external terminal PMu2 is a terminal used to input and output a second UMTS communication signal. The ninth individual terminal PIC19 connects to a ninth individual external terminal PMu3 in the high-frequency module 10. The ninth individual external terminal PMu3 is a terminal used to input and output a third UMTS communication signal.

Figure 2A:
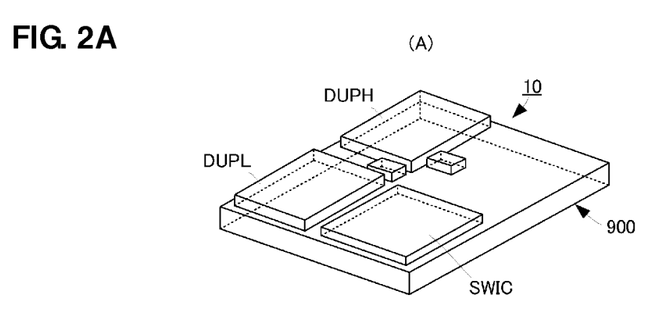
FIG. 2A is an external appearance perspective view of a high-frequency module.
Figure 2B:
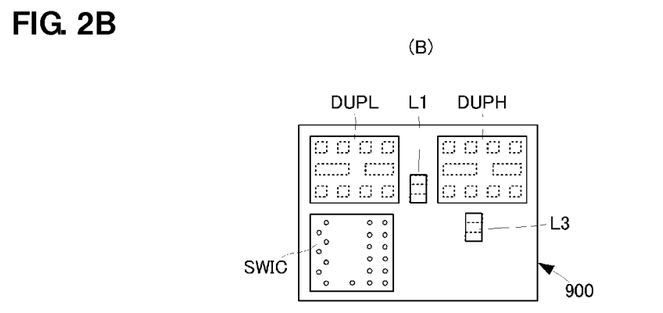
FIG. 2B is a mounting state diagram of individual circuit elements.
Figure 3:
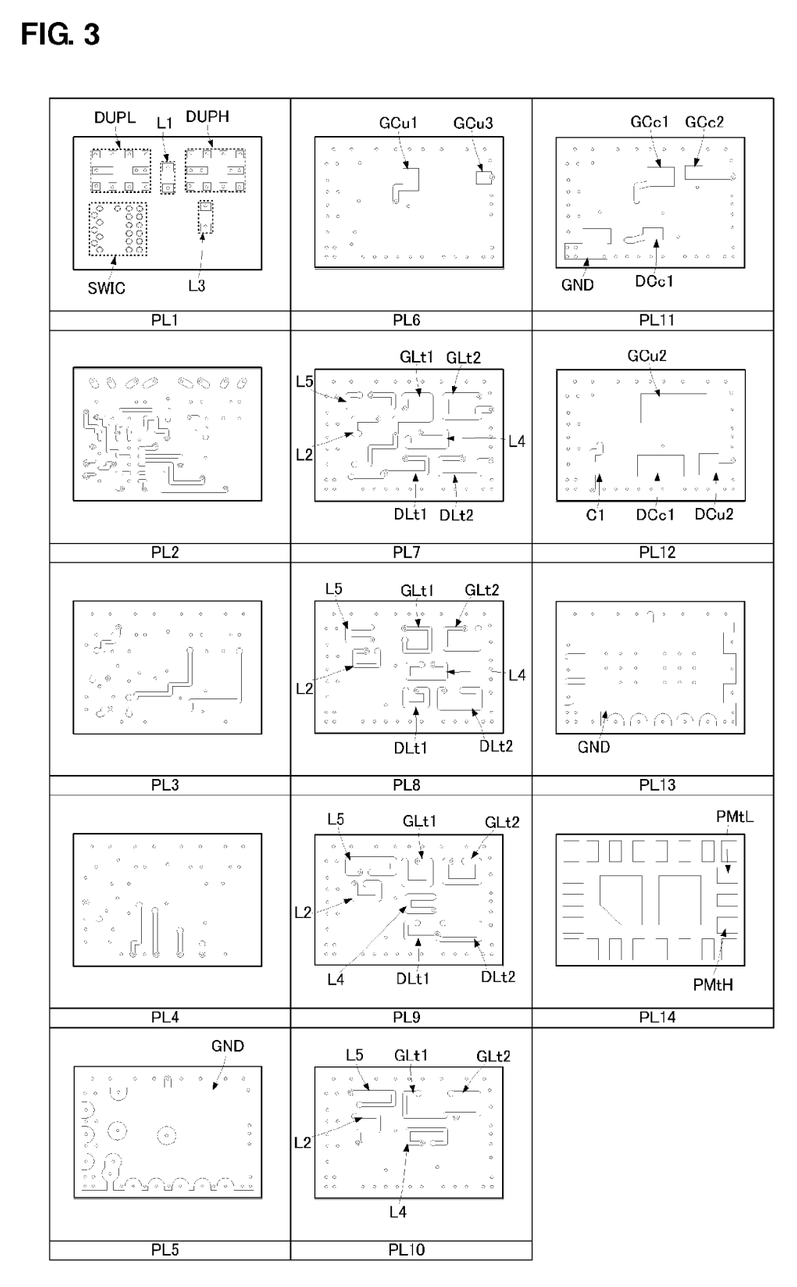
FIG. 3 is a lamination diagram of the high-frequency module.

Such a high-frequency module 10 is realized on the basis of the following structure. FIGS. 2A and 2B are diagrams for explaining the structure of the high-frequency module 10 according to the present preferred embodiment, FIG. 2A is an external appearance perspective view, and FIG. 2B is an upper surface mounting diagram. FIG. 3 is the lamination diagram of the high-frequency module 10.

The high-frequency module 10 includes a laminated body 900. The SAW duplexers DUPL and DUPH and the switch element SWIC are mounted on the upper surface of the laminated body 900. In addition, in the upper surface of the laminated body 900, mount inductor elements are mounted and define the inductors L1 and L3.

The laminated body 900 is obtained preferably by laminating a predetermined number of dielectric layers, and realizes a portion other than the above-mentioned individual mount circuit elements, in the high-frequency module 10, using inner layer electrode patterns. In addition, while, in the present preferred embodiment, a detailed layout pattern is not illustrated, each of the above-mentioned port electrodes used for external connections is arranged in a predetermined array in the bottom surface of the laminated body 900.

As illustrated in FIG. 3, the laminated body 900 is obtained by laminating a plurality of dielectric layers (e.g., preferably 14 layers in this example), a predetermined electrode pattern is provided on each dielectric layer, and via electrodes establishing interlayer connections are arranged. The via electrodes are indicated by circles illustrated in each layer in FIG. 3. In addition, hereinafter, while it is assumed that an uppermost layer is a first layer PL1, the numerical value of a layer increases with the layer being located on a lower layer side, and a lowermost layer is a fourteenth layer PL14, the descriptions thereof will be provided.

On the upper surface of the first layer PL1 serving as the uppermost layer, namely, the upper surface of the laminated body 900, element mounting electrodes are provided and used to mount the SAW duplexers DUPL and DUPH, the switch element SWIC, and the inductors L1 and L3.

On the upper surfaces of the second layer PL2, the third layer PL3, and the fourth layer PL4, lead pattern electrodes are provided. The ground electrode GND of an inner layer is arranged on substantially the whole upper surface of the fifth layer PL5.

On the upper surface of the sixth layer PL6, one facing electrode of each of the capacitors GCu1 and GCu3 is provided. The other facing electrode of each of these capacitors GCu1 and GCu3 is the ground electrode GND of the fifth layer PL5.

On the upper surface of the seventh layer PL7, substantially linear electrode patterns individually defining the inductors GLt1, GLt2, DLt1, DLt2, L2, L4, and L5 are provided.

On the upper surfaces of the eighth layer PL8 and the ninth layer PL9, substantially linear electrode patterns individually defining the inductors GLt1, GLt2, DLt1, DLt2, L2, L4, and L5 are also provided.

On the upper surface of the tenth layer PL10, substantially linear electrode patterns individually defining the inductors GLt1, GLt2, L2, L4, and L5 are provided.

On the upper surface of the eleventh layer PL11, one facing electrode of each of the capacitors GCc1, GCc2, and DCc1 is provided.

On the upper surface of the twelfth layer PL12, one facing electrode of each of the capacitors GCu2, DCc1, DCu2, and C1 are provided. In addition, one facing electrode of the capacitor GCu2 also functions as the other facing electrode of each of the capacitors GCc1 and GCc2.

The ground electrode GND of an inner layer is arranged on substantially the whole upper surface of the thirteenth layer PL13. The ground electrode GND also functions as the other facing electrode of each of the capacitors GCu2, DCc1, DCu2, and C1.

On the bottom surface of the fourteenth layer defining the lowermost layer, namely, the bottom surface of the laminated body 900, electrodes defining the first individual external terminal PMtL to the ninth individual external terminal PMu3, an electrode defining the antenna connection external terminal PMan, and an external-connection ground electrode are arranged in an array. These electrodes are arranged in an array so as to realize the circuit illustrated in FIG. 1 along with the above-mentioned electrode patterns in the individual layers.

Figure 4:
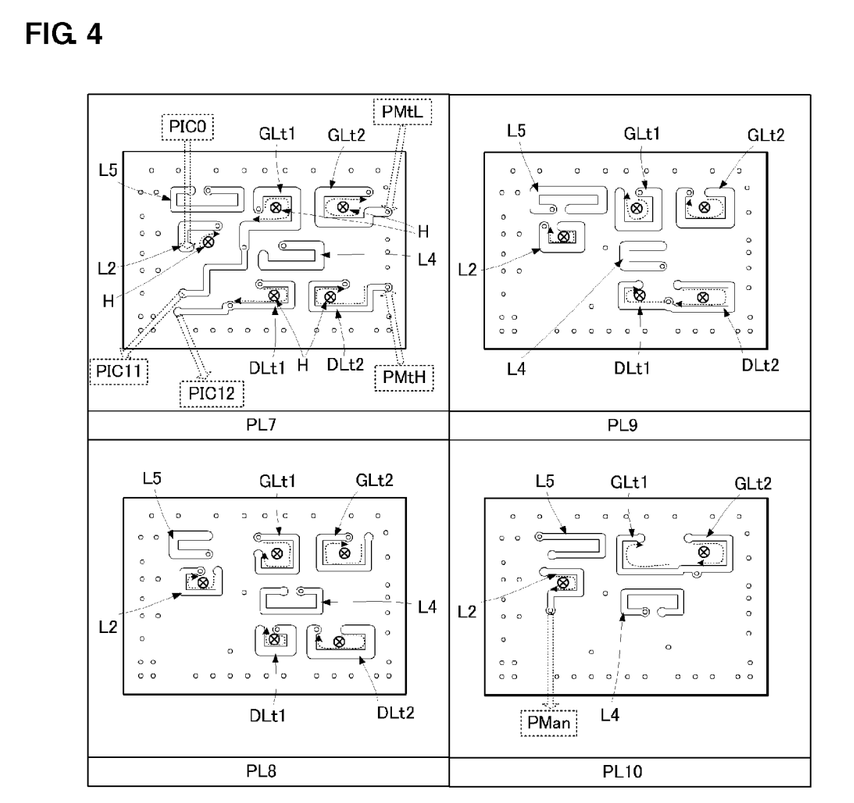
FIG. 4 is a magnification plan view of layers in which individual inductors within a laminated body are provided.

In such a configuration, the individual inductors GLt1, GLt2, DLt1, DLt2, L2, L4, and L5 defined by the inner layer electrode patterns are realized on the basis of such a specific configuration as illustrated below. FIG. 4 is the magnification plan view of layers in which individual inductors within the laminated body 900 are provided.

As illustrated in FIG. 4, each of the inductors GLt1 and GLt2 is defined by substantially linear electrode patterns provided on the seventh layer PL7, the eighth layer PL8, the ninth layer PL9, and the tenth layer PL10 and the via electrodes establishing interlayer connections.

When viewed from the upper surface, in the seventh layer PL7, the substantially linear electrode pattern of the inductor GLt2 is arranged so as to extend from an end portion on a side connecting to the first individual external terminal PMtL, in a clockwise fashion. End portions on the side connecting to the first individual external terminal PMtL and on an opposite side are connected to a substantially linear electrode pattern defining the inductor GLt2 in the eighth layer PL8, through via electrodes penetrating the seventh layer PL7.

When viewed from the upper surface, in the eighth layer PL8, the substantially linear electrode pattern of the inductor GLt2 is arranged so as to extend from an end portion connecting to a via electrode leading from the seventh layer PL7, in a clockwise fashion. End portions on a side connecting to the via electrode penetrating the seventh layer PL7 and on an opposite side are connected to a substantially linear electrode pattern defining the inductor GLt2 in the ninth layer PL9, through via electrodes penetrating the eighth layer PL8.

When viewed from the upper surface, in the ninth layer PL9, the substantially linear electrode pattern of the inductor GLt2 is arranged so as to extend from an end portion connecting to a via electrode penetrating the eighth layer PL8, in a clockwise fashion. End portions on a side connecting to the via electrode penetrating the eighth layer PL8 and on an opposite side are connected to a substantially linear electrode pattern defining the inductor GLt2 in the tenth layer PL10, through via electrodes penetrating the ninth layer PL9.

When viewed from the upper surface, in the tenth layer PL10, the substantially linear electrode pattern of the inductor GLt2 is arranged so as to extend from an end portion connecting to a via electrode penetrating the ninth layer PL9, in a clockwise fashion. End portions on a side connecting to the via electrode penetrating the ninth layer PL9 and on an opposite side are connected to a substantially linear electrode pattern defining the inductor GLt1.

In this way, when viewed from the upper surface of the laminated body 900, the inductor GLt2 has a shape winding in a clockwise fashion so as to extend from the seventh layer PL7 to the tenth layer PL10.

When viewed from the upper surface, in the tenth layer PL10, the substantially linear electrode pattern of the inductor GLt1 is arranged so as to extend from an end portion connecting to the inductor GLt2, in a clockwise fashion. End portions on a side connecting to the inductor GLt2 and on an opposite side are connected to a substantially linear electrode pattern defining the inductor GLt1 in the ninth layer PL9, through via electrodes penetrating the ninth layer PL9.

When viewed from the upper surface, in the ninth layer PL9, the substantially linear electrode pattern of the inductor GLt1 is arranged so as to extend from an end portion connecting to a via electrode penetrating the ninth layer PL9, in a clockwise fashion. End portions on a side connecting to the via electrode penetrating the ninth layer PL9 and on an opposite side are connected to a substantially linear electrode pattern defining the inductor GLt1 in the eighth layer PL8, through via electrodes penetrating the eighth layer PL8.

When viewed from the upper surface, in the eighth layer PL8, the substantially linear electrode pattern of the inductor GLt1 is arranged so as to extend from an end portion connecting to a via electrode penetrating the eighth layer PL8, in a clockwise fashion. End portions on a side connecting to the via electrode penetrating the eighth layer PL8 and on an opposite side are connected to a substantially linear electrode pattern defining the inductor GLt1 in the seventh layer PL7, through via electrodes penetrating the seventh layer PL7.

When viewed from the upper surface, in the seventh layer PL7, the substantially linear electrode pattern of the inductor GLt1 is arranged so as to extend from an end portion connecting to a via electrode penetrating the seventh layer PL7, in a clockwise fashion. End portions on a side connecting to the via electrode penetrating the seventh layer PL7 and on an opposite side are connected to the first individual terminal PIC11.

In this way, when the laminated body 900 is viewed from the upper surface, the inductor GLt1 has a configuration that is wound in a clockwise fashion so as to extend from the tenth layer PL10 to the seventh layer PL7.

Accordingly, as illustrated in FIG. 4, when a signal is transmitted from the first individual external terminal PMtL to the first individual terminal PIC11, a magnetic field whose axis corresponds to a direction extending from the seventh layer PL7 to the tenth layer PL10 occurs in each of the inductors GLt1 and GLt2.

In addition, the inductors DLt1 and DLt2 preferably include substantially linear electrode patterns provided on the seventh layer PL7, the eighth layer PL8, and the ninth layer PL9 and the via electrodes establishing interlayer connections.

When viewed from the upper surface, in the seventh layer PL7, the substantially linear electrode pattern of the inductor DLt2 is arranged so as to extend from an end portion on a side connecting to the second individual external terminal PMtH, in a clockwise fashion. End portions on the side connecting to the second individual external terminal PMtH and on an opposite side are connected to a substantially linear electrode pattern defining the inductor DLt2 in the eighth layer PL8, through via electrodes penetrating the seventh layer PL7.

When viewed from the upper surface, in the eighth layer PL8, the substantially linear electrode pattern of the inductor DLt2 is arranged so as to extend from an end portion connecting to a via electrode penetrating the seventh layer PL7, in a clockwise fashion. End portions on a side connecting to the via electrode penetrating the seventh layer PL7 and on an opposite side are connected to a substantially linear electrode pattern defining the inductor DLt2 in the ninth layer PL9, through via electrodes penetrating the eighth layer PL8.

When viewed from the upper surface, in the ninth layer PL9, the substantially linear electrode pattern of the inductor DLt2 is arranged so as to extend from an end portion connecting to a via electrode penetrating the eighth layer PL8, in a clockwise fashion. End portions on a side connecting to the via electrode penetrating the eighth layer PL8 and on an opposite side are connected to a substantially linear electrode pattern defining the inductor DLt1.

In this way, when the laminated body 900 is viewed from the upper surface, the inductor DLt2 has a configuration that is wound in a clockwise fashion so as to extend from the seventh layer PL7 to the ninth layer PL9.

When viewed from the upper surface, in the ninth layer PL9, the substantially linear electrode pattern of the inductor DLt1 is arranged so as to extend from an end portion connecting to the inductor DLt2, in a clockwise fashion. End portions on a side connecting to the inductor DLt2 and on an opposite side are connected to an electrode pattern defining the inductor DLt1 in the eighth layer PL8, through via electrodes penetrating the eighth layer PL8.

When viewed from the upper surface, in the eighth layer PL8, the substantially linear electrode pattern of the inductor DLt1 is arranged so as to extend from an end portion connecting to a via electrode penetrating the eighth layer PL8, in a clockwise fashion. End portions on a side connecting to the via electrode leading from the eighth layer PL8 and on an opposite side are connected to an electrode pattern defining the inductor DLt1 in the seventh layer PL7, through via electrodes penetrating the seventh layer PL7.

When viewed from the upper surface, in the seventh layer PL7, the substantially linear electrode pattern of the inductor DLt1 is arranged so as to extend from an end portion connecting to a via electrode penetrating the seventh layer PL7, in a clockwise fashion. End portions on a side connecting to the via electrode penetrating the seventh layer PL7 and on an opposite side are connected to the second individual terminal PIC12.

In this way, when the laminated body 900 is viewed from the upper surface, the inductor DLt1 has a configuration that is wound in a clockwise fashion so as to extend from the ninth layer PL9 to the seventh layer PL7.

Accordingly, as illustrated in FIG. 4, when a signal is transmitted from the second individual external terminal PMtH to the second individual terminal PIC12, a magnetic field whose axis corresponds to a direction headed from the seventh layer PL7 to the ninth layer PL9 occurs in each of the inductors DLt1 and DLt2.

The inductors L2, L4, and L5 preferably include substantially linear electrode patterns provided on the seventh layer PL7, the eighth layer PL8, the ninth layer PL9, and the tenth layer PL10 and the via electrodes establishing interlayer connections.

When viewed from the upper surface, in the seventh layer PL7, the substantially linear electrode pattern of the inductor L2 is arranged so as to extend from an end portion on a side connecting to the common terminal PIC0, in a clockwise fashion. End portions on the side connecting to the common terminal PIC0 and on an opposite side are connected to an electrode pattern defining the inductor L2 in the eighth layer PL8, through via electrodes penetrating electrodes in the seventh layer PL7.

When viewed from the upper surface, in the eighth layer PL8, the substantially linear electrode pattern of the inductor L2 is arranged so as to extend from an end portion connecting to a via electrode penetrating the seventh layer PL7, in a clockwise fashion. End portions on a side connecting to the via electrode penetrating the seventh layer PL7 and on an opposite side are connected to an electrode pattern defining the inductor L2 in the ninth layer PL9, through via electrodes penetrating the eighth layer PL8.

When viewed from the upper surface, in the ninth layer PL9, the substantially linear electrode pattern of the inductor L2 is arranged so as to extend from an end portion connecting to a via electrode penetrating the eighth layer PL8, in a clockwise fashion. End portions on a side connecting to the via electrode penetrating the eighth layer PL8 and on an opposite side are connected to an electrode pattern defining the inductor L2 in the tenth layer PL10, through via electrodes penetrating the ninth layer PL9.

When viewed from the upper surface, in the tenth layer PL10, the substantially linear electrode pattern of the inductor L2 is arranged so as to extend from an end portion connecting to a via electrode penetrating the ninth layer PL9, in a clockwise fashion. End portions on a side connecting to the via electrode penetrating the ninth layer PL9 and on an opposite side are connected to the antenna connection external terminal PMan.

In this way, when the laminated body 900 is viewed from the upper surface, the inductor L2 has a configuration that is wound in a clockwise fashion so as to extend from the seventh layer PL7 to the tenth layer PL10.

Accordingly, as illustrated in FIG. 4, when a signal is transmitted from the common terminal PIC0 to the antenna connection external terminal PMan, a magnetic field whose axis corresponds to a direction headed from the seventh layer PL7 to the ninth layer PL9 occurs owing to the inductor L2.

In this way, by utilizing the configuration of the present preferred embodiment, the inductors GLt1 and GLt2 connected in series in the transmission line of the transmission side filter 12A, the inductors DLt1 and DLt2 connected in series in the transmission line of the transmission side filter 12B, and the inductor L2 connected in series in the transmission line of the antenna side matching circuit 11 are arranged within the laminated body 900 so that the directions of the generated magnetic fields coincide with one another. Accordingly, the magnetic fields generated by the inductors GLt1, GLt2, DLt1, DLt2, and L2 turn out to be independent of one another, and are prevented from being electromagnetic-field-coupled to one another. Accordingly, it is possible to cause each of the inductors GLt1, GLt2, DLt1, DLt2, and L2 to function with a characteristic complying with circuit design. Accordingly, it is possible to sufficiently obtain the attenuation characteristics of the second harmonic waves and the attenuations of the third harmonic waves of the transmission side filters 12A and 12B. In addition, it is possible to prevent and suppress magnetic field coupling between the individual terminal side (transmission circuit side) of the switch element SWIC and the antenna connection side. Accordingly, it is possible to prevent a reception signal received by the antenna from leaking to the transmission circuit side. Accordingly, it is possible to output the reception signal without the occurrence of an undesired attenuation.

In addition, as described above, the inductors GLt1, GLt2, DLt1, DLt2, L2, L4, and L5 are preferably provided on the same layers in three layers including the seventh layer, the eighth layer, and the ninth layer.

In addition, as illustrated in FIG. 4, the inductors GLt1, GLt2, DLt1, DLt2, L4, and L5 are arranged so as not to overlap with one another when the laminated body 900 is viewed along the lamination direction.

Owing to such a configuration, it is possible to prevent the individual inductors GLt1, GLt2, DLt1, DLt2, L2, L4, and L5 from being electromagnetic-field-coupled to one another along the lamination direction. Accordingly, it is possible to more effectively prevent and suppress electromagnetic field coupling between the above-mentioned inductors GLt1, GLt2, DLt1, DLt2, and L2.

In addition, as illustrated in FIG. 3, inner layer ground electrodes GND are arranged on dielectric layers PL5 and PL13 so as to sandwich therebetween dielectric layers PL7, PL8, PL9, and PL10 in which the individual inductors GLt1, GLt2, DLt1, DLt2, L2, L4, and L5 are provided. When seen in a plan view of the laminated body 900, the ground electrodes GND are arranged so as to include the defining regions of the inductors GLt1, GLt2, DLt1, DLt2, L2, L4, and L5.

Furthermore, the laminated body 900 is preferably formed so that, by adjusting the thicknesses of the dielectric layers, distances between the substantially linear electrode patterns of the inductors GLt1, GLt2, DLt1, DLt2, L2, L4, and L5 in the dielectric layer PL7 and the ground electrode GND in the dielectric layer PL5 and distances between the substantially linear electrode patterns of the inductors GLt1, GLt2, L2, L4, and L5 in the dielectric layer PL10 and the ground electrode GND in the dielectric layer PL13 are shorter than distances between the inductors GLt1, GLt2, DLt1, DLt2, L2, L4, and L5 on a plane surface on the same layer.

Owing to such a configuration, each of the inductors GLt1, GLt2, DLt1, DLt2, L2, L4, and L5 is electromagnetic-field-coupled to the ground electrode GND along the lamination direction, and magnetic fields individually generated in the inductors are be independent of one another. Accordingly, it is possible to prevent the individual inductors from being electromagnetic-field-coupled to one another on a plane surface within a layer. Accordingly, each inductor functions with an element value complying with circuit design, it is possible to prevent and suppress the characteristic degradation of each of the transmission side filters 12A and 12B, the leaks of the second harmonic wave and the third harmonic wave between the transmission side circuit and a circuit on the antenna side, and leaking of the reception signal to the transmission side circuit.

In addition, as illustrated in the dielectric layers PL7, PL8, PL9, and PL10 in FIG. 3 and FIG. 4, distances on a plane surface between the substantially linear electrode pattern of the inductor L2 in the antenna side matching circuit 11 and the substantially linear electrode patterns of the inductors GLt1, GLt2, DLt1, and DLt2 in the transmission side circuit are made longer than distances on a plane surface between the substantially linear electrode patterns of the inductors GLt1, GLt2, DLt1, and DLt2 in the transmission side circuit. Therefore, it is possible to further prevent and suppress electromagnetic field coupling between the inductor L2 in the antenna side matching circuit 11 and the inductors GLt1, GLt2, DLt1, and DLt2 in the transmission side circuit. Therefore, it is possible to further prevent and suppress the leaks of the second harmonic wave and the third harmonic wave between the transmission side circuit and a circuit on the antenna side and leaking of the reception signal to the transmission side circuit.

In addition, in the above-mentioned preferred embodiment, when the inductor L2 is formed with the common terminal PIC0 of the switch element SWIC as a starting point so as to wind in a substantially spiral shape clockwise from the upper surface side of the laminated body 900 to the bottom surface side thereof, the inductors GLt1, GLt2, DLt1, and DLt2 are formed with the first individual external terminal PMtL and the second individual external terminal PMtH as starting points so as to wind in a substantially spiral shape clockwise from the upper surface side of the laminated body 900 to the bottom surface side thereof, the first individual external terminal PMtL and the second individual external terminal PMtH defining the input ends of the transmission signals. However, when the inductor L2 is formed in the same substantially spiral shape in a counterclockwise fashion, all of the inductors GLt1, GLt2, DLt1, and DLt2 are preferably formed so as to wind in a substantially spiral shape counterclockwise from the upper surface side of the laminated body 900 to the bottom surface side thereof. More specifically, the winding direction of a substantially linear electrode pattern defining each inductor is preferably determined so that the direction of a magnetic field generated in the inductor L2 connected in series to the signal transmission path on the antenna side and the directions of magnetic fields generated in the inductors GLt1, GLt2, DLt1, and DLt2 connected in series to the signal transmission paths within the transmission side circuit coincide with one another.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A high-frequency module comprising:
a laminated body including an antenna connection external terminal connected to an antenna and a plurality of individual external terminals to each of which a transmission circuit used to transmit a plurality of communication signals and a reception circuit used to receive the plural communication signals are connected;
a switch element provided in the laminated body and including a common terminal connected to the antenna connection external terminal and a plurality of individual terminals connected to the plurality of individual external terminals;
a plurality of inductors on an individual terminal side, provided within the laminated body and individually connected in series between the plurality of individual terminals and the plurality of individual external terminals; and
an inductor on an antenna side and connected in series between the antenna connection external terminal and the common terminal; wherein
the plurality of inductors on the individual terminal side do not overlap with one another when the laminated body is viewed along a lamination direction, and are arranged within the laminated body so that directions of generated magnetic fields coincide with one another;
a first inner layer ground electrode is provided on an upper layer, a second inner layer ground electrode is provided on a lower layer, and an inner layer electrode pattern of each of the plurality of inductors on the individual terminal side and the inductor on the antenna side is located on a layer located between the upper layer and the lower layer, such that the first inner layer ground electrode and the second inner layer ground electrode cover the inner layer electrode pattern of each of the plurality of inductors and the inductor on the antenna side when viewed from the lamination direction; and
the inductor on the antenna side and the plurality of inductors on the individual terminal side do not overlap with one another when the laminated body is viewed along the lamination direction, and are arranged within the laminated body so that directions of generated magnetic fields coincide with one another.

2. The high-frequency module according to claim 1, wherein the inner layer electrode patterns of the plurality of inductors on the individual terminal side are located on a plurality of same layers of the laminated body.

3. The high-frequency module according to claim 2, wherein the inner layer electrode pattern of the inductor on the antenna side and the inner layer electrode patterns of the plurality of inductors on the individual terminal side are located on a plurality of same layers of the laminated body, and distances between the inner layer electrode pattern of the inductor on the antenna side and the inner layer electrode patterns of the plurality of inductors on the individual terminal side when the laminated body is viewed in the lamination direction are longer than distances between the inner layer electrode patterns of the plurality of inductors on the individual terminal side.

4. The high-frequency module according to claim 2, wherein:
a distance between the inner layer electrode pattern of the inductor closest to the inner layer ground electrode and the inner layer ground electrode is shorter than distances between the inner layer electrode patterns individually defining the plurality of inductors.

5. The high-frequency module according to claim 1, wherein the plurality of inductors on the individual terminal side are inductors of a filter circuit connected to the transmission circuit.

6. The high-frequency module according to claim 5, wherein the filter circuit is a low pass filter attenuating a second harmonic wave and a third harmonic wave of a transmitted communication signal, and the plurality of inductors on the individual terminal side include a series inductor to attenuate the second harmonic wave and a series inductor to attenuate the third harmonic wave.

* * * * *